Figure 1:
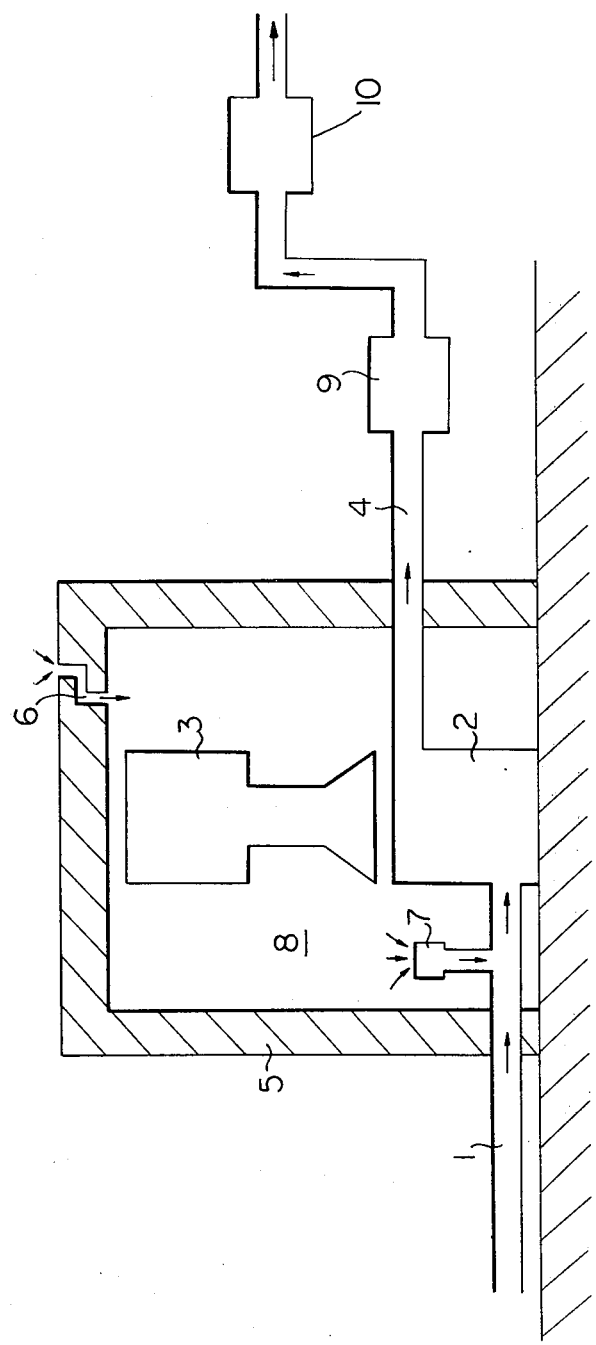

United States Patent [19]

Machi et al.

[11] 3,997,415

[45] Dec. 14, 1976

[54] PROCESS FOR REMOVING SULFUR DIOXIDE AND NITROGEN OXIDES FROM EFFLUENT GASES

[75] Inventors: Sueo Machi, Takasaki; Keita Kawamura, Yokohama; Shingi Aoki, Fujisawa, all of Japan

[73] Assignee: Ebara Manufacturing Co., Ltd., Tokyo, Japan

[22] Filed: Feb. 28, 1974

[21] Appl. No.: 446,765

[30] Foreign Application Priority Data

Mar. 3, 1973  Japan .............. 48-25289

[52] U.S. Cl. .............. 204/157.1 H; 423/242; 423/235
[51] Int. Cl.² .............. B01J 1/10
[58] Field of Search ........... 204/157.1 H, 157.1 R; 423/235, 242

[56] References Cited
UNITED STATES PATENTS

| | | | |
|---|---|---|---|
| 3,389,971 | 6/1968 | Alliger | 204/157.1 |
| 3,565,777 | 2/1971 | Lauer | 204/157.1 |
| 3,653,185 | 4/1972 | Scott et al. | 204/312 |
| 3,715,187 | 2/1973 | Bartholomew et al. | 423/242 |
| 3,790,660 | 2/1974 | Earl et al. | 423/242 |
| 3,869,362 | 3/1975 | Machi et al. | 204/157.1 H |

*Primary Examiner*—Oscar R. Vertiz
*Assistant Examiner*—Wayne A. Langel
*Attorney, Agent, or Firm*—Stevens, Davis, Miller & Mosher

[57] ABSTRACT

Sulfur dioxide and nitrogen oxides can be removed from effluent gases with increased efficiency by blowing contaminated air present in the irradiation room into a stream of the effluent gases before the mixture is delivered to a reaction chamber to be irradiated with an ionizing radiation or ultraviolet light. This provides also a convenient process for purifying the contaminated air containing nitrogen oxides and ozone before release into the atmosphere. Thus, simultaneous purification of industrial effluent gases and contaminated air is advantageously carried out.

2 Claims, 1 Drawing Figure

PROCESS FOR REMOVING SULFUR DIOXIDE AND NITROGEN OXIDES FROM EFFLUENT GASES

This invention relates to a method and an apparatus for removing noxious gas pollutants such as sulfur dioxide and nitrogen oxides from industrial effluent gases by means of irradiation. More particularly, the invention relates to a method and an apparatus for removing noxious gas pollutants which will cause air pollution when released into the atmosphere such as, for example, sulfur dioxide, various forms of nitrogen oxides (hereinafter referred to as $NO_x$), ozone and the like.

That is, when radiation is applied to various industrial processes, including a process for treating effluent gases, using a radiation source placed in an irradiation room which is constructed by a shielding wall for limiting the radiation substantially to the inside thereof, a significant amount of noxious gases such as nitrogen oxides, ozone, etc. are produced within said irradiation room, thereby producing contaminated air therein. That is, when an object is exposed to radiation such as electron beams $\gamma$-rays and the like, using corpuscular beam sources such as, for example, an electron beam accelerator, or a radioactive isotope such as cobalt-60 ($^{60}Co$), cesium-137 ($^{137}Ce$) and the like, not only the object to be irradiated but also air in the irradiation room is exposed to radiation. As a result, a significant amount of $NO_x$ and $O_3$ is generated, thereby contaminating air in the irradiation room.

In the existing circumstances, the contaminated air thus produced is released into the atmosphere after dilution with a large amount of fresh air or after filtration by special filters. But, these are not satisfactory means to avoid air pollution, because the released pollutants accumulate in the atmosphere, thereby bringing about serious air pollution problem, sometimes causing a photochemical smog. Thus, substantial elimination of the pollutant from the irradiated air before discard into the atmosphere is desired from the viewpoint of environmental sanitation. In addition, from another viewpoint, it is often requested to discharge polluted air in the irradiation room as soon as possible and replace it with unpolluted air, not by means of direct release into the atmosphere. This is necessary, for example, in case a worker must enter the irradiation room to make repairs and adjustments.

Meanwhile, the manner of treating industrial effluent gases to remove pollutants therefrom has become a matter of serious concern to those working in this field. Among the pollutants, sulfur dioxide ($SO_2$) and nitrogen oxides ($NO_x$) are particularly troublesome and harmful and therefore an improved process for removing $SO_2$ and $NO_x$ effectively and efficiently from the effluent gases before release into the atmosphere has been strongly desired. Among the processes intended to accomplish said object, there is a process in which the effluent gases are treated with irradiation. But, there has not been, up to now, a process proven to be advantageous in practice.

Accordingly, one object of the present invention is to provide a process and an apparatus for conveniently discarding polluted air generated in the irradiation room which is employed in various radiochemical industries.

Another object of the invention is to provide an improved process and an apparatus for removing pollutants, especially $SO_2$ and $NO_x$, from effluent gases by treating the gases with irradiation.

Yet another object of the present invention is to provide a process and an apparatus for simultaneously purifying irradiated air and industrial effluent gases effectively and efficiently before release into the atmosphere, thereby contributing to the improvement of environmental sanitation.

The above and other objects of the present invention can be accomplished according to the present invention by mixing polluted air from an irradiation room with effluent gases from various industrial plants before the mixture thus made is irradiated in a reaction chamber with an ionizing radiation or ultraviolet light. According to the process as mentioned above, not only is polluted air from the irradiation room conveniently purified, but also the efficiency of removal of pollutants from effluent gases substantially increases. As a result, all pollutants contained in both the contaminated air and the effluent gas are effectively removed to a satisfactory degree.

Reference to "ionizing radiations" herein is intended to include $\alpha$-rays, $\beta$-rays, $\gamma$-rays, X-rays, accelerated electron beams, and the like. In the practice of the present invention, ultraviolet light as well as said ionizing radiations can be used effectively. High-energy electron beams can be employed most advantageously from an industrial viewpoint. The ionizing radiation or the ultraviolet light is generally applied at a dose rate of from $10^5$ rad/sec to $10^{15}$ rad/sec for a total dose of from $1 \times 10^6$ rad to $1 \times 10^7$ rad.

Dose rate preferably used is in the region of $10^5 - 10^{10}$ rad/sec, most preferably in the region of $10^5 - 10^8$ rad/sec. Total dose preferably used is in the region of $1 \times 10^6$ rad $- 7 \times 10^6$ rad, most preferably in the region of $1 \times 10^6 - 5 \times 10^6$ rad.

One preferred embodiment of the present invention is illustrated below with reference to the drawing attached hereto.

In FIG. 1, the effluent gas to be treated containing $SO_2$ and $NO_x$ moves in a path through a connecting conduit 1, and then enters the reaction chamber 2, where the gas is irradiated with radiation from the radiation source 3 which is placed near the reaction chamber 2. The irradiated gas with reaction products of pollutants in mist and dust form leaves the reaction chamber, and then moves along the conduit 4 into the mist and dust collector 9.

In the collector 9, the mist and solid particles are removed from the gas, and the thus purified gas is released into the atmosphere.

In the event that there remains substantial amounts of $SO_2$, the gas can first be passed through a means 10 for removing $SO_2$ so the $SO_2$ is removed to a satisfactory degree.

During the process, contamination of air in the irradiation room 8 proceeds as a result of irradiation. The contaminated air thus produced contains a significant amount of $NO_x$ and $O_3$ produced by irradiation. According to the process of the invention, this contaminated air is blown into the conduit 1 by the blower 7, instead of being released into the atmosphere after simple dilution, to join the industrial effluent gas before entering the reaction chamber 2. Alternatively, said contaminated air can be introduced into the reaction chamber directly. Then, the mixed gases are irradiated in the reaction chamber, where all harmful gas pollutants such as $NO_x$, $SO_2$ $O_3$ and the like are converted to mist and solid particles.

The shielding wall 5 has an inlet 6, from which fresh air is introduced into the irradiation room 8, to supplement air discharged by the blower 7. The inlet 6 preferably has two bends as shown in the drawing, in order to reduce radiation leakage to a minimum. Capacity of the blower 7 is determined depending on the size of irradiation room, types and intensities of radiation specifically used, manner of applying radiation and the like.

As a result of using the process including continuous removal of contaminated air present in the irradiation room 8 by the blower 7, and continuous supplement of fresh air through the inlet 6, it has become possible for a worker to enter the irradiation room to make repairs and adjustments soon after stopping the operation. Another important advantages of the invention include being able to discharge contaminated air in the irradiation room freely without worrying about troublesome problems concerning environmental pollution.

The process of the present invention is especially useful when it is applied to cases such as a case in which long time irradiation is effected, or a case in which a reaction chamber, as shown 2 in FIG. 1, and a radiation source, as shown 3 in FIG. 1, are spaced significantly apart from each other, that is, the cases in which a large amount of $NO_x$ and $O_3$ may be produced.

Another important advantage of the invention is that by the addition of contaminated air from the irradiation room to the effluent gases generated from various industrial plants, the efficiency of removal of $NO_x$ and $SO_2$ from said effluent gases is substantially improved.

Another advantage of the invention is that the addition of $NO_x$ and $O_3$ produced in the irradiation room to the effluent gases to be treated with irradiation increases the reaction velocity of $SO_2$, thereby changing it from noxious gas form to mist or solid particle form rapidly.

Yet another important advantage of the present invention is that instruments and apparatuses present in the irradiation room are protected from corrosion by highly corrosive pollutants such as $NO_x$ and $O_3$, as a result of removing such gases rapidly.

The invention is further illustrated by the following examples of preferred embodiments thereof, although it will be understood that these examples are included merely for purposes of illustration and are not intended to limit the scope of the invention unless otherwise specifically indicated.

In the following examples, irradiation was carried out using an electron beam accelerator placed inside the irradiation room, 5 meters long, 7 meters wide and 3.5 meters high, namely one having the capacity of 122.5 $m^3$.

EXAMPLE 1

200 $m^3$/hour of the effluent gas generated by combustion of heavy oil, containing 1000 ppm of $SO_2$ and 250 ppm of $NO_x$, was delivered to a reaction chamber 2 according to the process as shown in FIG. 1.

The blower 7 in the drawing was being operated to give a flow rate of 50 $m^3$ of air per hour. In the reaction chamber, the gas mixture was irradiated with an electron beam of 5 KW using an electron beam accelerator of the type of Cockroft-Walton.

The distance between the lowest surface of the accelerator 3 and the top surface of the reaction chamber 2 was 5 cm. A gas sample was taken from the stream of irradiated gas issuing from the outlet *b* of the reaction chamber 2 and was analyzed for $SO_2$, $O_3$ and $NO_x$. Almost no $SO_2$, $O_3$ and $NO_x$ were detected.

Another gas sample was taken from inside the irradiation chamber and analyzed for pollutants. Almost no $O_3$ and $NO_x$ were detected.

EXAMPLE 2

(Reference Example)

Example 1 was repeated except that the blower 7 was not operated. Analysis of a gas sample taken from the irradiated gas stream issuing from the outlet of the irradiation room showed that the $SO_2$ and $NO_x$ content was 90 ppm and 20 ppm respectively. The $O_3$ and $NO_x$ content of the irradiated air present in the irradiation chamber 2 during the operation was 130 ppm and 80 ppm respectively.

Although the invention has been described in considerable detail with reference to certain preferred embodiments thereof, it will be understood that variations and modifications can be effected without departing from the spirit and scope of the invention as described hereinabove and as defined in the appended claims.

What we claim is:

1. A process for removing $NO_x$ and $SO_2$ from effluent gases containing $NO_x$ and $SO_2$ while simultaneously purifying contaminated air containing $NO_x$ and $O_3$ which is produced in an irradiation room comprising:
   discharging the contaminated air containing $NO_x$ and $O_3$ from the irradiation room by an exhaust blower and mixing it with a stream of the effluent gases containing $NO_x$ and $SO_2$,
   irradiating the mixture of the effluent gases containing $SO_2$ and $NO_x$ and the contaminated air containing $NO_x$ and $O_3$ in a reaction chamber with electron beams from an electron beam accelerator placed near the reaction chamber to give a total dose of about 1 megarad or more, thereby converting substantially all of the gaseous $NO_x$ and some $SO_2$ to reaction products in the form of a mist and/or fine solid particles,
   delivering the irradiated gases with the reaction products thus produced to a collecting means, where said reaction products are separated from the gases,
   delivering the gases containing the remaining $SO_2$ to means for removing $SO_2$ and removing substantially all of the remaining $SO_2$ and
   releasing the thus purified effluent gases into the atmosphere.

2. A process for removing $NO_x$ and $SO_2$ from effluent gases containing $NO_x$ and $SO_2$ while simultaneously purifying contaminated air containing $NO_x$ and $O_3$ which is produced in an irradiation room comprising:
   discharging the contaminated air containing $NO_x$ and $O_3$ from the irradiation room by an exhaust blower to blow it directly into a reaction chamber to which a stream of the effluent gases containing $NO_x$ and $SO_2$ is delivered,
   irradiating the mixture of the effluent gases containing $SO_2$ and $NO_x$ and the contaminated air containing $NO_x$ and $O_3$ in a reaction chamber with electron beams from an electron beam accelerator placed near the reaction chamber to give a total dose of about 1 megarad or more, thereby converting substantially all of the gaseous $NO_x$ and some $SO_2$ to reaction products in the form of a mist and/or fine solid particles, delivering the irradiated gases with the reaction products thus produced to a collecting means, where said reaction products are separated from the gases, delivering the gases containing the remaining $SO_2$ to a means for removing $SO_2$ and removing substantially all of the remaining $SO_2$, and releasing the thus purified effluent gases into the atmosphere.

* * * * *